May 16, 1967  B. L. JORDAN ETAL  3,319,407
CUTTING DEVICE

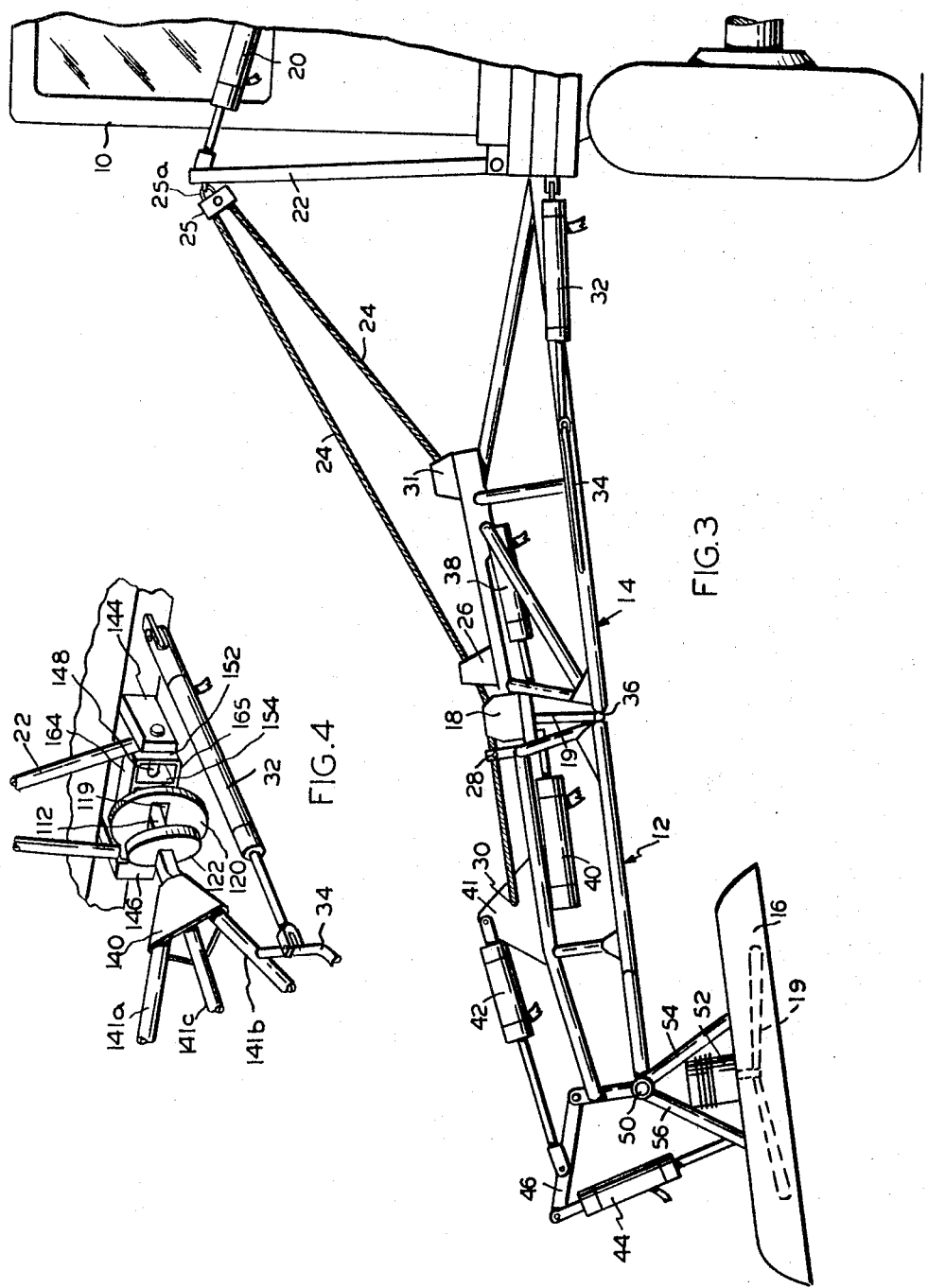

Filed Oct. 22, 1965  10 Sheets-Sheet 8

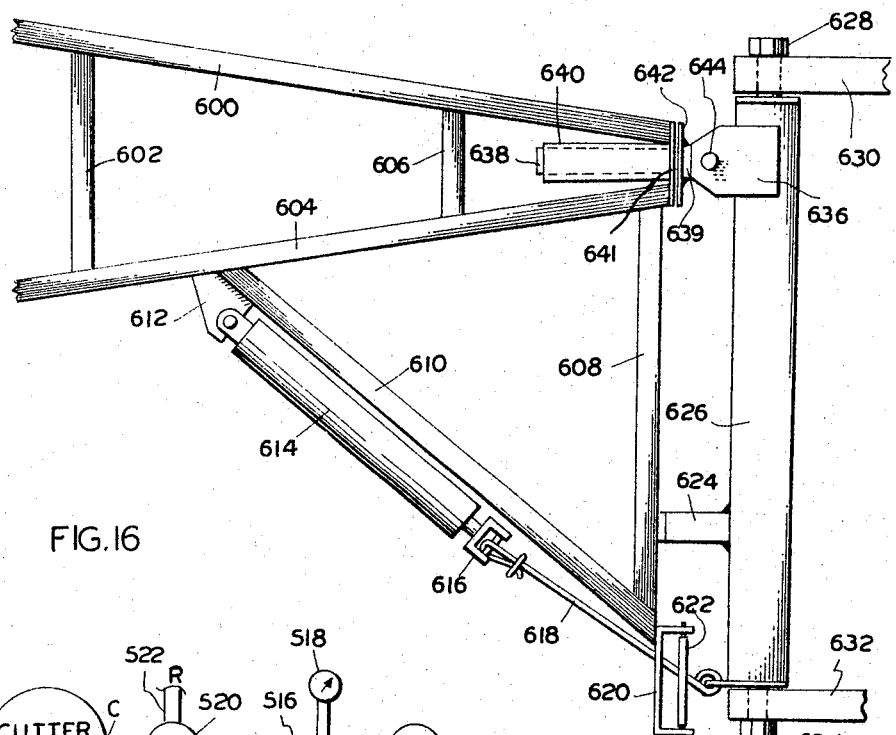
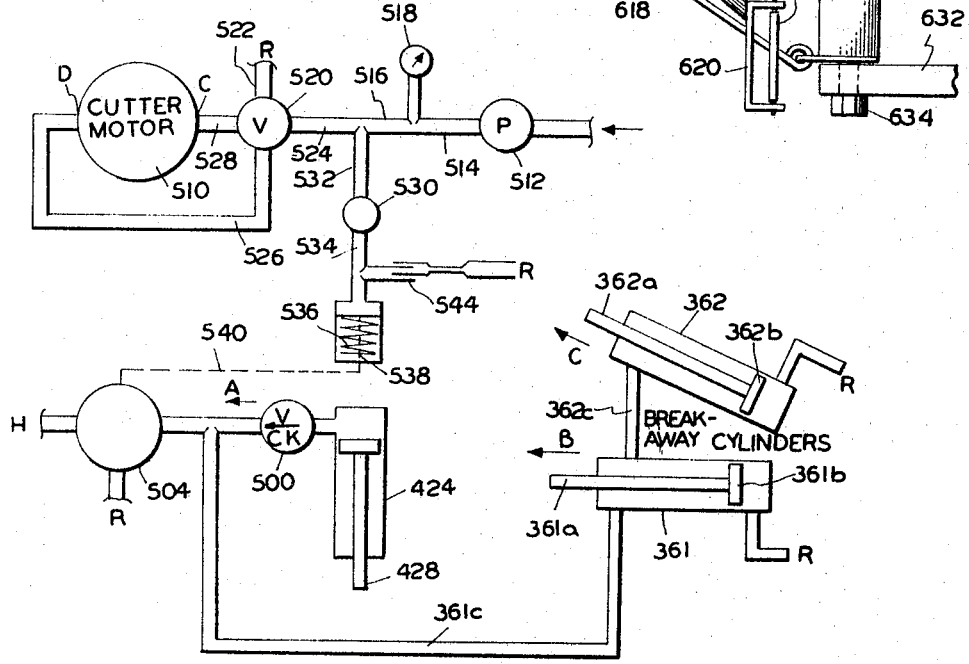
FIG.16
FIG.15

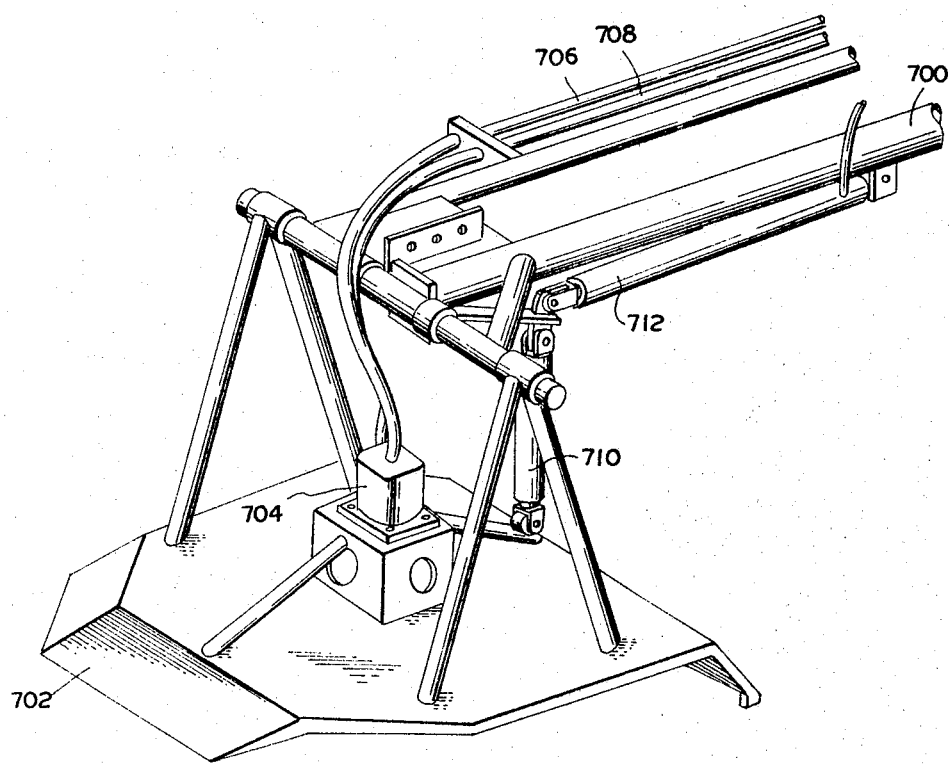
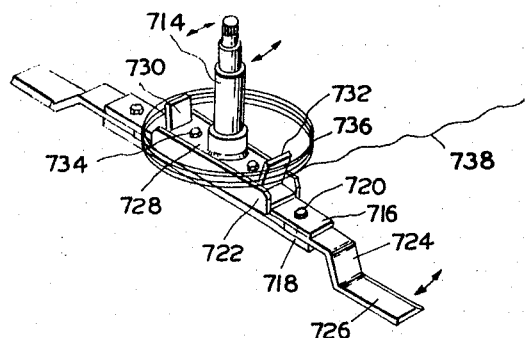
FIG.17

United States Patent Office 3,319,407
Patented May 16, 1967

3,319,407
CUTTING DEVICE
Bertram L. Jordan, Lewiston, and John D. Mitchell,
 Woodville, N.C., assignors to Harrington Manufacturing Co., Lewiston, N.C., a corporation of North Carolina
Filed Oct. 22, 1965, Ser. No. 507,606
13 Claims. (Cl. 56—25.4)

This application is a continuation-in-part of application Ser. No. 311,523, now abandoned, filed Sept. 25, 1963.

This invention generally relates to a mobile cutting device. More specifically this invention pertains to a laterally extending boom attachment that is adapted to be mounted on a mobile base and which controls the position of a cutting blade as the cutting blade is being moved along through material to be cut.

One of the long-standing problems of highway and railroad maintenance has been the control of the level of brush, weeds and foliage along adjacent portions of the right-of-way. The portions of brush and shrubs immediately bordering the right-of-way may be controlled by conventional means but when drainage ditches border the right-of-way, the brush, weeds and foliage along the bank of the ditch furthest away from the right-of-way cannot be controlled by conventional means. Often the ditches are slow to drain, which creates additional problems for a regular system of maintenance. In some cases the banks are too steep to allow a vehicle to pass close enough to cut the foliage to any distance up the slope. Fences or other obstructions may cut off access to areas which must be controlled.

It is an object of this invention to provide a crane or boom arrangement for positioning a cutting assembly for right-of-way maintenance.

It is another object of this invention to provide a support for a cutting assembly which is readily attachable to conventional road maintenance equipment.

It is an additional object of this invention to provide a right-of-way trimming or maintenance assembly which may be positioned to trim foliage from areas displaced from the right-of-way at different levels, in a variety of different planes and in positions which are inaccessible to conventional equipment.

These and other objects and advantages will become more apparent after reading the following description in conjunction with the drawings wherein:

FIGURE 3 is a front view showing the boom and cutter assembly in a laterally extended position;

FIGURE 4 is an enlarged fragmentary perspective view of the boom pivotal attachment means;

FIGURE 15 is a diagrammatic view of a hydraulic system useful in connection with the second embodiment of the invention;

FIGURE 16 is a top fragmentary view of an alternative form of boom "breakway" construction in accordance with this invention;

FIGURE 17 illustrates another important feature useful with the present invention.

The invention will be specifically described first in relation to the embodiment of the invention which is shown in FIGURES 1–7.

The cutting device of this invention may be mounted on nearly any kind of a mobile base such as (a) a specially designed vehicle having appropriate counterbalancing means, (b) a tractor, (c) a railway vehicle adapted to travel along railroad tracks, (d) a motor road grader or (e) a trailer. It may be mounted either on the front, side or back of the mobile base.

A laterally extendible boom is connected to the mobile base. The primary purpose of the laterally extendible boom is to permit selective positioning of the cutter blade at spaced distances away from the mobile base and at the desired distance above the ground.

The laterally extendible boom comprises an inner boom section 14 and an outer boom section 12. Each boom section may consist of a single strong rigid member or a framework of lighter members.

The inner end of the inner boom section 14 is mounted on the mobile base so that it can move both through a lateral arc and through a vertical arc with respect to the mobile base. For instance, the inner boom may be attached to the mobile base by a universal joint or other pivotal means that will allow movement of the boom with respect to the mobile base about *several axes*.

Figure 5:
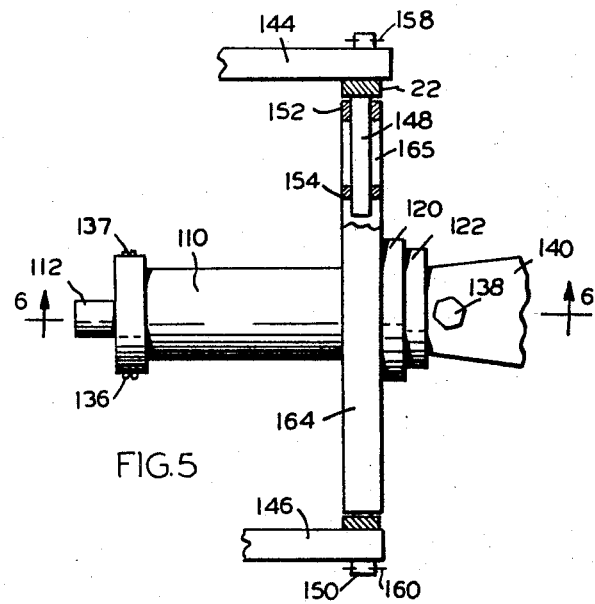
FIGURE 5 is a top fragmentary view of the boom pivotal attachment means.

Pivotal movement about an axis parallel to the direction of travel of the vehicle may be obtained by using the arrangement shown in FIGURE 5. Support members 144 and 146 extend laterally from the mobile base. Two parallel members 164 and 165 extend between the support members 144 and 146. The parallel members are joined by brace members 152 and 154 on each side of adjacent members 144 and 146. The parallel members 164 and 165 are pivotally mounted on shafts 148 and 150. The distance between brace members 152 and 154 must be designed to accommodate the vertical forces on shafts 148 and 150.

A plate 120 is secured to the parallel members 164 and 165 so as to pivot about an axis through shafts 148 and 150.

Figure 6:
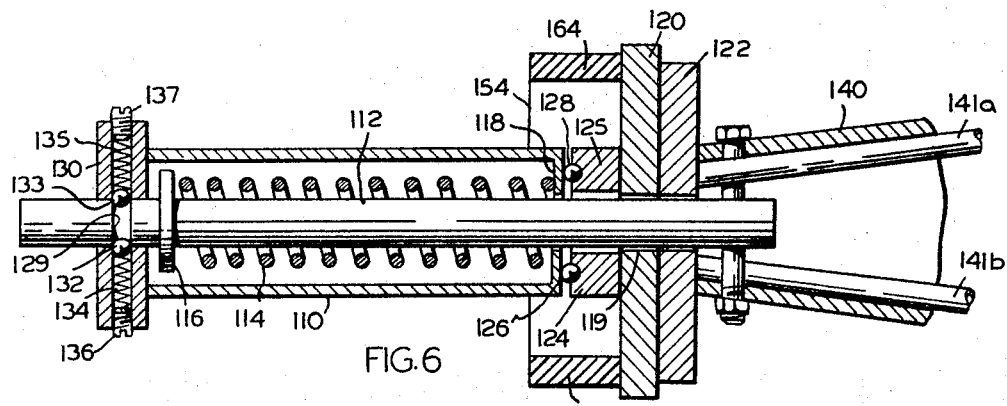
FIGURE 6 is a cross-sectional view along line 6—6 of FIGURE 5.

One form of joint which provides particular advantages is shown in the embodiment of FIGURE 6. The boom terminates at a circular plate 122 which is welded or otherwise attached to boom strength members 141a, 141b and 141c which are welded to housing 140. A shaft 112 is attached to the boom by a pin 138. The shaft passes through plate 120 which is attached to the base as described above in conjunction with FIGURE 5. The shaft 112 passes through a slot 119 in plate 120. The plate 122 is biased against plate 120 by a spring assembly. A cylinder 110 surrounds the shaft 112. Within the cylinder 110 a compression spring 114 applies force against the shaft 112 by means of a stop plate 116 which is welded or otherwise secured to the shaft 112. The compression spring 114 exerts force on the cylinder 110 through an annular end plate 118. The spring resiliently biases the shaft so that plate 122 is held against plate 120 and the cylinder 110 is resiliently biased against the plate 120 through ball seats 126 and 128 which ride in indentations in bearing members 124 and 125 which are secured to plate 120. The ball seats 128 and 126 are positioned above and below shaft 112. With this arrangement rotary movement of the spring, cylinder and shaft is possible and resilient axial movement of shaft 112 is allowed. Limited pivotal movement about an axis passing through the intersection of ball seats 126 and 128 and the cylinder is possible by virtue of the slot 119 in plate 120.

A circumferential groove 129 is provided in the shaft 112. Ball detents 132 and 133 are biased through radial holes in plate 130 by springs 134 and 135 which may be inserted upon the removal of threaded plugs 136 and 137. The ball detents 132 and 133 ride in the groove 129 to inhibit axial movement of shaft 112. Plate 130 is connected to cylinder 110.

If a force is applied against the boom two possible movements may occur. If the forces applied produce a resultant torque force on the boom the shaft 112 will be caused to rotate about its axis. On the other hand if a force about an axis passing through the plate 120 is applied to the boom, the edge of circular plate 122 will bear against plate 120 and act as a vertex for the pivotal movement of the boom. As the force of plate 122 pivots away from the plate 120 an axial force is applied to shaft 112. The axial force produced by this action also has a component of force producing a movement about the ball seats 126 and 128 thereby causing the shaft spring and cylinder assembly to pivot slightly about a vertical axis. The axial force must first overcome the force of ball detents 132 and 133 which must be forced to retract before the shaft can move axially. After overcoming the force of the ball detents 132 and 133, the shaft 112 acts through plate 116 to compress the spring 114. Thus the boom is allowed to resiliently pivot about an axis which is transverse to the direction of travel of the mobile base.

The outer end of the outer boom section 12 is connected to a cutting assembly. This is accomplished by means of shaft 50 and supporting framework 54 and 56. The cutting assembly is preferably of the type including a rotary cutting blade 19 and a light-weight shroud 16 mounted parallel to the plane of rotation of the cutting blade. The shroud 16 covers the blade 19 and minimizes the danger of having cut material thrown out from beneath the hood or of having the blade bump up against items too big to be easily cut.

The cutting assembly is preferably welded or otherwise formed into one unit. Freely swinging replaceable blades are desirable. The shroud may be mounted on replaceable skid shoes and a replaceable front bumper for pushing over vines and brush may be provided.

While the rotary cutter provides particular advantages, (e.g. it may be lowered while cutting into a mass of foliage without jamming) other types of cutting arrangements might be used.

Figure 8:
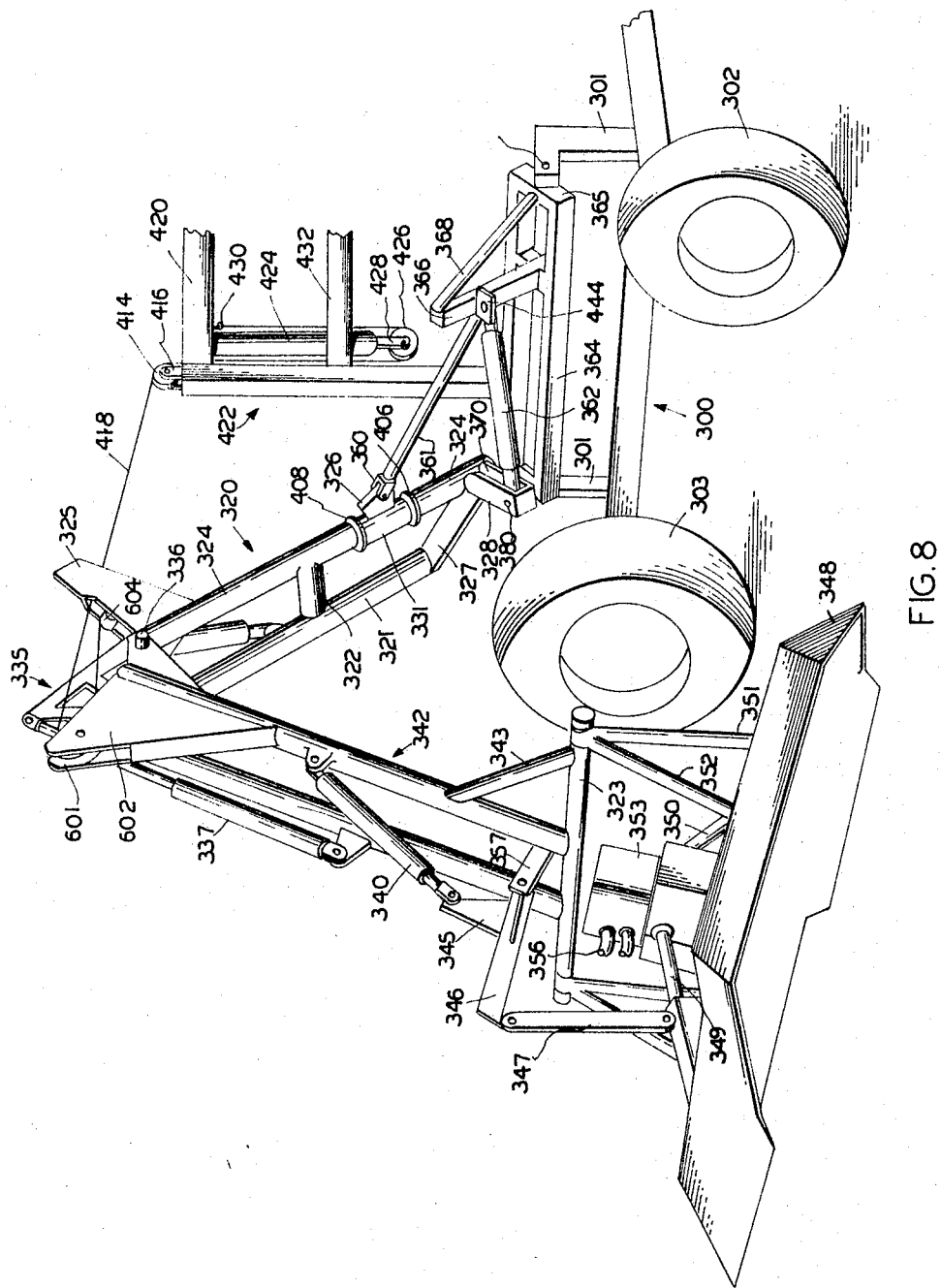
FIGURE 8 is a perspective view of a second embodiment of this invention.
Figure 9:
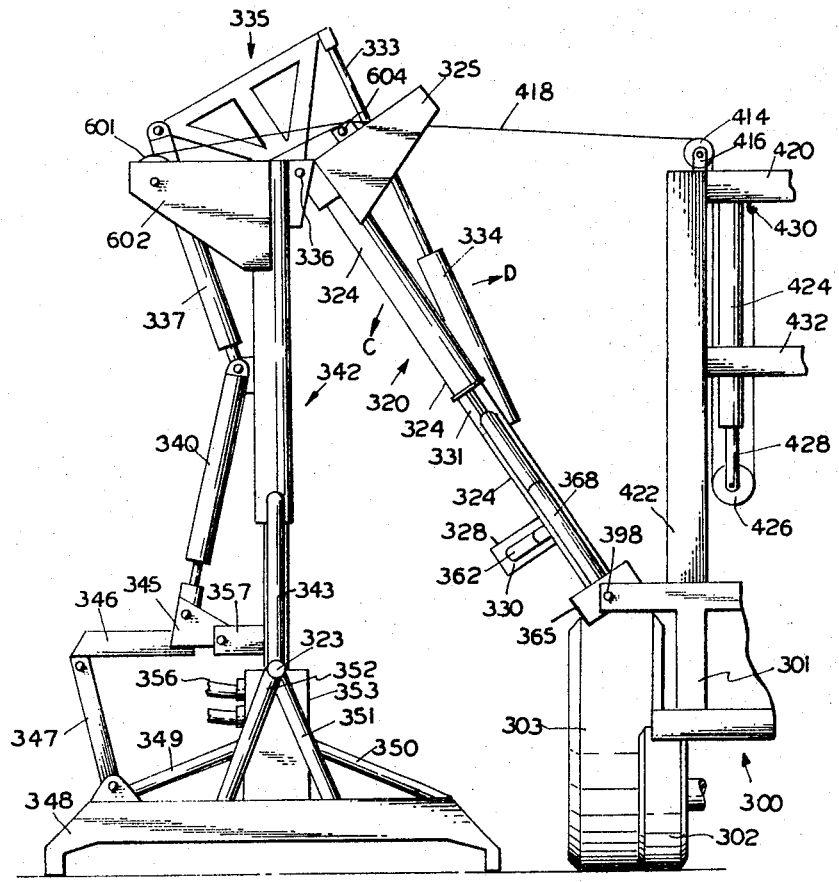
FIGURE 9 is a front view of the second embodiment with the boom in a slightly different position than is shown in FIGURE 8.

The outer end of inner boom 14 and the inner end of the outer boom 12 are joined to an intermediate pivot member that has an axis transverse to axes of said inner and outer boom sections, whereby said inner and outer boom sections can move relative to each other through a plane passing through both the axes of said inner and outer boom sections. As shown in FIGURE 3, boom portions 12 and 14 are pivotally connected by pin 36. (FIGURES 1, 2 and 3 do not show the aforesaid pivotal connection too well, and reference is therefore made to the specific and more detailed showing of the pivotal connection that is shown in FIGURES 8 and 9.) Also connected to pin 36 is a pivotal arm 19 having a head 18 (see FIG. 3). Arm 19 pivots about pin 36 to position the head 18. Cable 24 is guided around the elbow structure by guides 26 and 28 and a slot along the top of the head 18. Rotating cable bearing members or rollers may be provided in guides 26 and 28 and in head 18.

Figure 1:
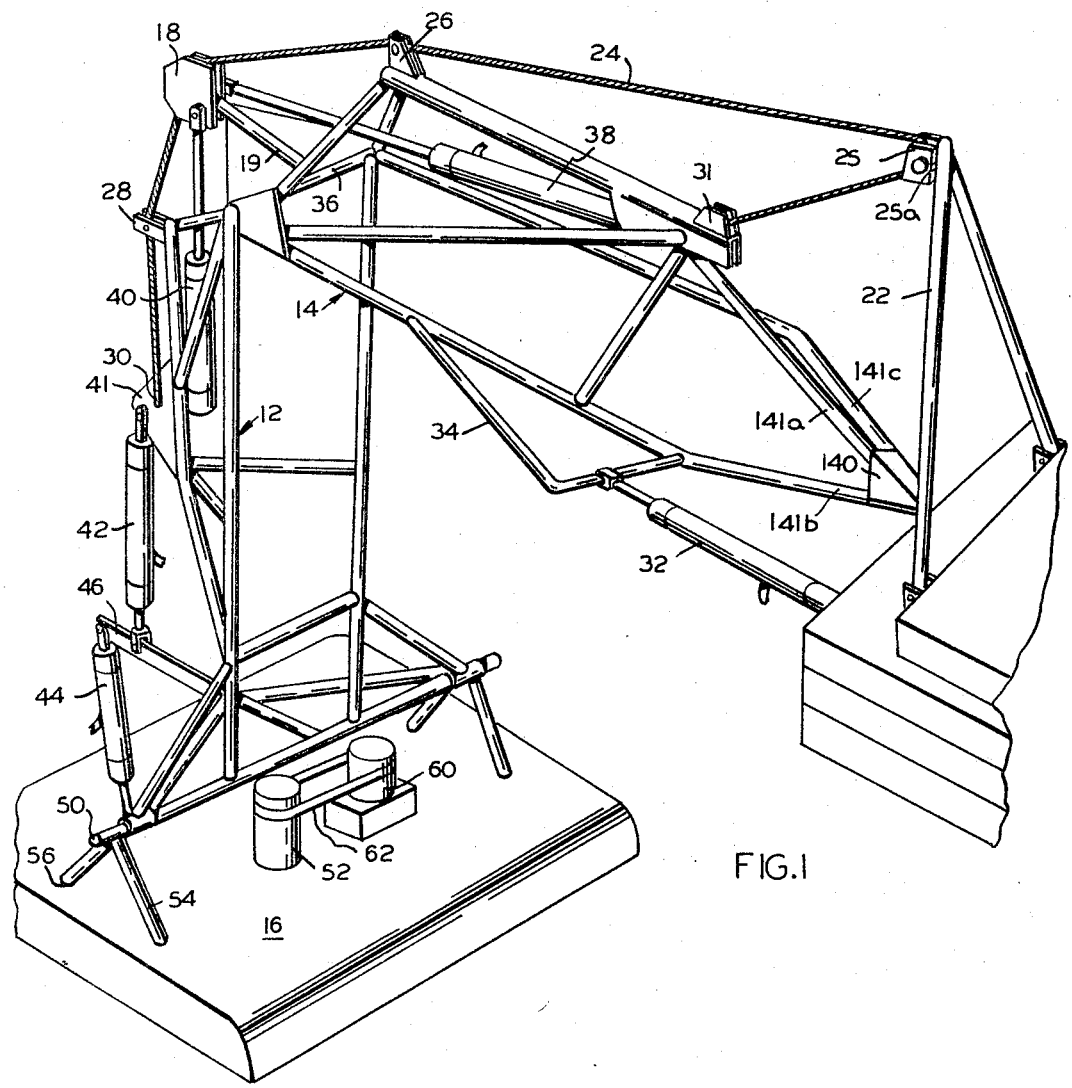
FIGURE 1 is a perspective view of a first embodiment of the invention showing a boom and cutter assembly.
Figure 2:
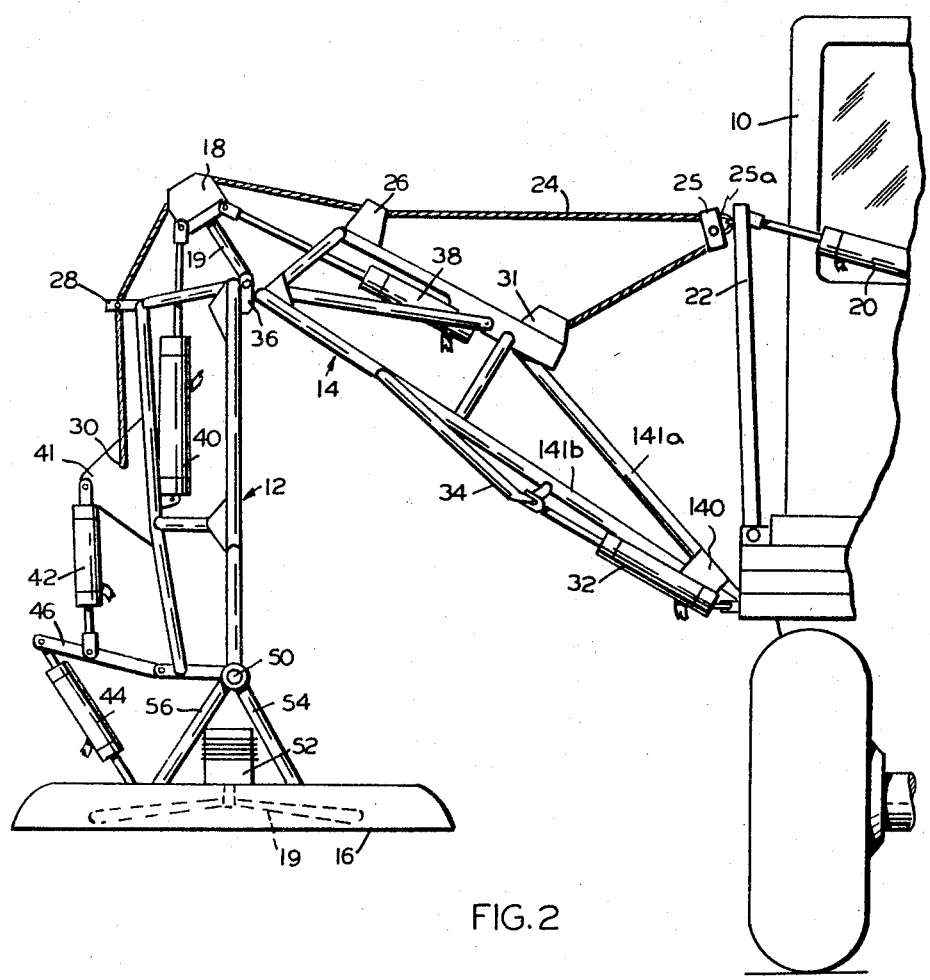
FIGURE 2 is a front view showing the suspension of the boom and cutter assembly from a mobile base.

An adjustable linkage means is mounted on said laterally extending boom in order to adjust the angular relationship of said inner and outer boom sections with respect to each other. The adjustable linkage means as shown in FIGURES 1, 2 and 3 consists of a first hydraulic cylinder 40 attached to a portion of boom 12 and to head 18 which pivots about pin 36 through arm 19 and a second hydraulic cylinder 38 attached to boom portion 14 by means of its framework and connection is maintained with head 18. Movement of cylinders 38 and 40 results in a change in the positional relationship of the inner and outer booms.

In order to attain the position of FIGURE 3 both cylinders must be retracted and the position of FIGURE 2 requires that both be partially extended. The cylinders are preferably actuated by the same pressure source and this pressure source is preferably separate from that of the other hydraulic cylinders in the device. If different forces occur on the portions of the boom the cylinders will compensate for the difference. This condition may occur through the action of the cable 24 on the head 18.

In FIGURES 1, 2 and 3a cable means 24 extends between said mobile base and said laterally extending boom and a cable pulling means is mounted on said mobile base for periodically pulling said cable means 24 toward the mobile base. As shown in FIGURES 2 and 3 the cable pulling means comprises a hydraulic cylinder 20 (a "main boom left cylinder") which is guided by a pivoting lever 22 which restricts the movement of the cylinder to a single vertical plane. A cable 24 is anchored to the outer boom 12 at point 30, rollers or other guide means are provided at brackets 26 and 28 and the cable is guided around the "elbow" portion of the boom by head 18 which may also include roller guides. The cable is attached at its other end to the inner boom section 14 at point 31. Force is applied from the lever 22 through a swiveled bracket 25 which includes a pulley or roller engaging means. The bracket is attached to the lever 22 by means of a suitable swivel 25a. The point of application of force to the cable will depend on the relative position of boom portions 12 and 14. Retraction of the cylinder 20 will cause the lever 22 to lift the boom.

Several advantages arise from the cable suspension. First, the strength of the cable reduces the amount of bracing required in the boom. Secondly, when the boom pivots about the point of support on the mobile base, i.e. the hinge assembly on an axis which is transverse to the direction of travel, the cable and lever prevent force from being applied on the hydraulic cylinder 20 and it is retained in its plane of operation. Because of the movement of bracket 25 in the direction of movement of the boom the stress on the hydraulic cylinder mountings and seals is reduced. Thirdly, the portions 12 and 14 of the boom may be adjusted about the intermediate pivot 36 without altering the position of the cylinder 20.

Releasable lateral positioning means are preferably provided between the boom and the mobile base so as to maintain the position of the boom to one side of the mobile base. The most usual position for the boom during cutting operations is extending laterally (approximately horizontally) from the mobile base (e.g. at approximately a right angle). However, in case an obstruction should be encountered by the boom (or the cutter on the end of the boom) which would result in an excessive backward force against the boom, the provision of a "breakaway" action for the boom is necessary in order to prevent possible permanent damage to the boom and/or cutter.

A preferred "breakaway" system in accordance with this invention utilizes a "connector" extending between said mobile base and a point intermediate the ends of said inner boom, said connector comprising a hydraulic cylinder 32 as is illustrated in FIGURES 1, 2 and 3. This hydraulic cylinder is "releasable" when the pressure within the cylinder exceeds a predetermined level. Upon "release" of the cylinder 32 (i.e. when the pressure exceeds a predetermined level), the boom will be free to pivot backwardly about a generally vertical axis, thus avoiding damage to the boom. Hydraulic cylinders which are biased to release upon the attainment of a certain pressure within the cylinder are well known in the hydraulic art and accordingly a detailed explanation of such a cylinder is not deemed necessary. The particular advantage of a hydraulic cylinder over other possible ways of achieving a "breakaway" action (e.g. such as a spring) is that the "breaking" point of a cylinder may be set to occur at a sharp point (whereas a spring tends to give a continuously resilient action). The hydraulic system for hydraulic cylinder 32 is preferably tied in with hydraulic cylinder 20 so that there is a "slaving" action between the two, as will be described more fully hereinafter in connection with the second embodiment of the invention.

One or more hydraulic cylinders (or other fluid operating means) are preferably linked from the outer boom section to the cutting assembly so that the position of the cutting assembly with respect to the outer extremity of outer boom 12 can be adjusted about shaft 50, which is on an axis transverse to the length of the boom. In FIGURE 2, the preferred linkage system is illustrated whereby two hydraulic cylinders 42 and 44 are utilized. Cylinder 42 is attached to an anchor plate 41 on outer boom 12 and moves a lever 46 about a pivotal attachment to outer boom section 12. Additional adjustment of the cutting assembly is achieved by use of the hydraulic cylinder 44 which is attached to lever 46 and cutter shroud 16. Two cylinders attached in this manner allow adjustment of the cutter through a greater angle than could be accomplished through the use of a single cylinder. A comparison of FIGURES 2 and 3 reveals the angle through which the cutter may be moved.

A drive motor 60 is mounted on the cutting assembly and is provided with belts 62 to drive the cutter through pulley head 52. A plurality of V-belts is preferred. The drive motor is preferably hydraulic although an electric or internal combustion engine might be used. Since the preferred adjusting means is hydraulic, the hydraulic conduits may conveniently be extended to the cutter assembly to power the cutting operation through a hydraulic motor.

A valuable safety feature which is provided to prevent damage to the cutting assembly and boom will automatically retract the boom upon the engagement of an immovable object or foliage which is too dense for the cutter to sever. A pressure operated servo-valve operator is set to a predetermined pressure limit in the cutter motor drive circuit. Upon the attainment of this limit pressure the boom lift cylinder 20 will be automatically actuated to lift the boom upwardly, thereby disengaging the cutter from its area of cutting. When the boom is lifted upwardly from the obstacle the operator can then maneuver so that the cutter assembly will cut in another area. In attaining this feature it is preferable to utilize different fluid circuits for the drive motor and for the boom adjusting cylinders. A servo-valve operator can be attached to the valve which controls the cylinder 20, and the servo is connected to the pressure line of the motor circuit. When the pressure in the motor circuit exceeds a certain level the servo will be actuated and the control valve for cylinder 20 will be opened thereby actuating the cylinder 20.

Figure 7:
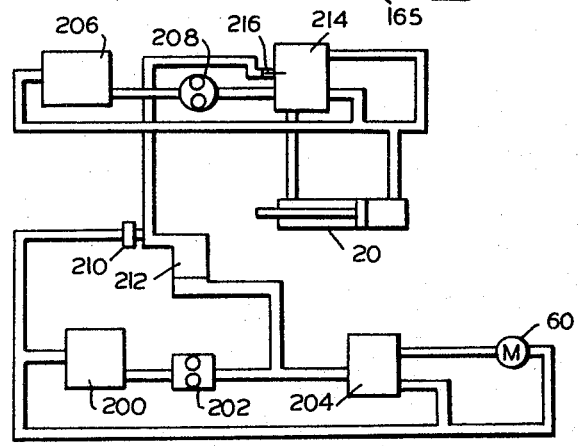
FIGURE 7 is a diagrammatic view of a hydraulic system useful in connection with the first embodiment of this invention.

In FIGURE 7 a suitable hydraulic circuit is shown which will achieve the response to abnormal motor circuit pressure. The motor 60 is operated by means of pump 202 which forces fluid from sump 200 through the motor 60 and return with control provided by valve 204. A check valve 212 which is adjusted to a desired pressure limit is connected to a servo-valve operator 216. A restrictor 210 will eventually release servo 216 by bleeding off the fluid which has passed through the check valve 212. The boom cylinder operating circuit includes a pump 208, sump 206 and control valve 214 which will operate cylinder 20. The valve 214 may be opened by the servo cylinder 216 or manually.

The check valve controls the point at which the boom will be automatically actuated to lift the cutter assembly away from an obstruction.

A second embodiment of my invention is illustrated in FIGURES 8–15. This second embodiment is particularly useful when the overall width of the cutting device is important, e.g. when the cutting device is to be mounted on a mobile vehicle that is adapted to travel along railroad tracks. This second embodiment is similar to the first embodiment in many respects.

A mobile base 300 is provided having wheels 302 and 303. The mobile base is preferably provided with a sturdy supporting framework upon which the laterally extendible boom is to be connected. As shown, the supporting framework consists of spaced apart fixed portions and an intermediate "cradle" portion. The cradle portion comprises a rectangular framework consisting of end members 365 and side members 364. Pins 398 pass through each of the end members 365 and serve to pivotally support the aforesaid cradle portion within the spaced apart fixed portions. The fixed portions can merely consist of sturdy rigid bars 301 welded to the mobile base. (For purposes of clarity only the front fixed portion 301 is shown in complete detail in FIGURES 8 and 9, the rear fixed portion being partially obscured in FIGURE 1.)

A laterally extendible boom is connected to the mobile base. The laterally extendible boom consists of an inner boom section 320 and an outer boom section 342.

The inner end of the inner boom section 320 is mounted on the mobile base so that it can both (a) move through a vertical plane, (b) move through a limited lateral arc and (c) rotate to a limited extent about its own axis. The exact manner in which the boom is constructed and mounted in order to do this is omitted from FIGURE 8 but will be described more specifically hereinafter in connection with FIGURES 10 and 11.

Figure 11:
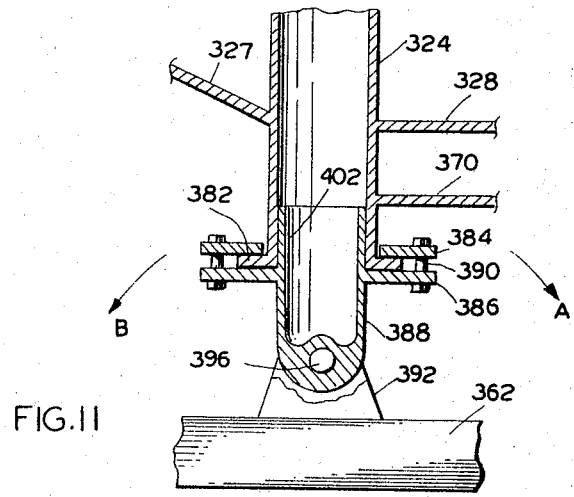
FIGURE 11 is a fragmentary enlarged sectional view showing a portion of the inner boom section of the second embodiment and how it is mounted.
Figure 10:
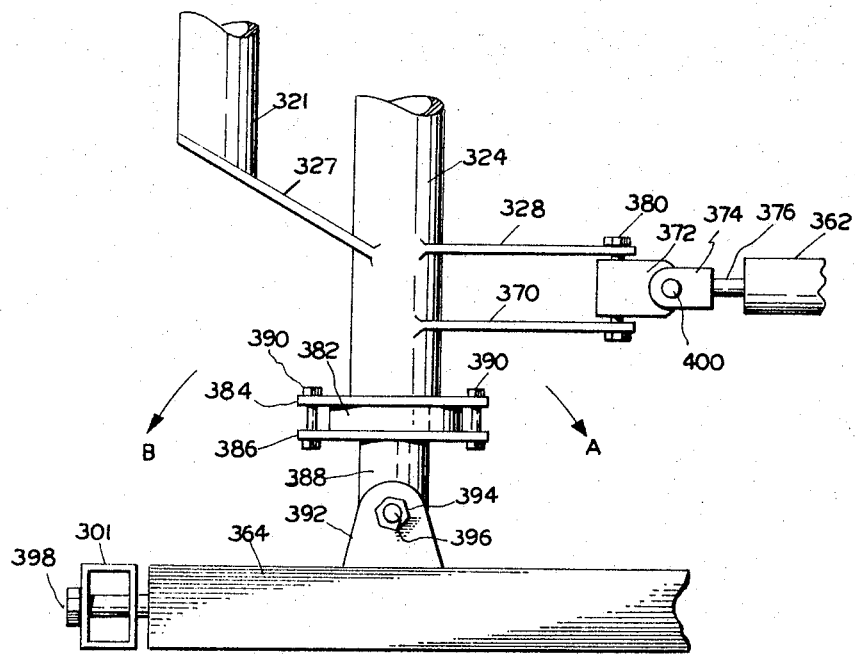
FIGURE 10 is a fragmentary enlarged view showing a portion of the inner boom section of the second embodiment and how it is mounted.
Figure 13:
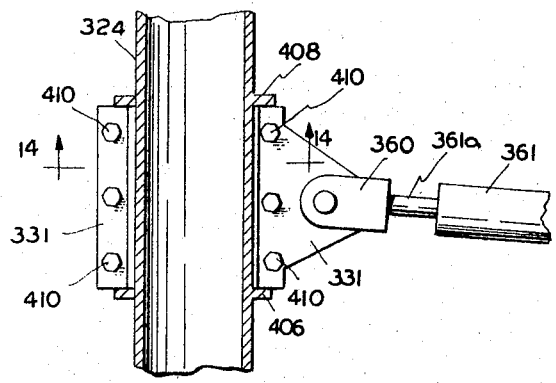
FIGURE 13 is another fragmentary enlarged view of a portion of the releasable lateral positioning means used in the second embodiment of the invention.

In FIGURES 10 and 11 it will be seen that the side member 364 has welded or otherwise fastened to it a pair of mounting brackets 392 (only one of which is shown) and a bolt 396 passes through aligned holes in said brackets. Nut 394 fits on one end of bolt 396. Pivot member 388 fits between mounting brackets 392 and said member has a hole in its lower portion which receives bolt 396. It will be noted (see FIGURE 11) that pivot member 388 has a central tubular extension 402 and a circumferential platform 386 which are adapted to directly receive and support the inner end of the inner boom section. Specifically, the tubular section 324 constitutes the main component of the inner boom section 320 and the flanged portion 382 thereof is adapted to rest directly upon circumferential platform 386 and surround tubular extension 402, and to be held thereon by bolts 390 and clamping member 384. Bolts 390 and clamping member 384 are sufficiently loose to permit the tubular section to rotate about its own axis. Tubular section 324 can thereby pivot in the directions indicated by arrows A and B, which is to say in a direction parallel to side members 364.

It is thus seen that inner boom section 320 can pivot in the directions indicated by arrows C and D (see FIGURE 9) by virtue of pins 398, or it can pivot in the directions indicated by arrows A and B (see FIGURES 10 and 11).

Figure 12:
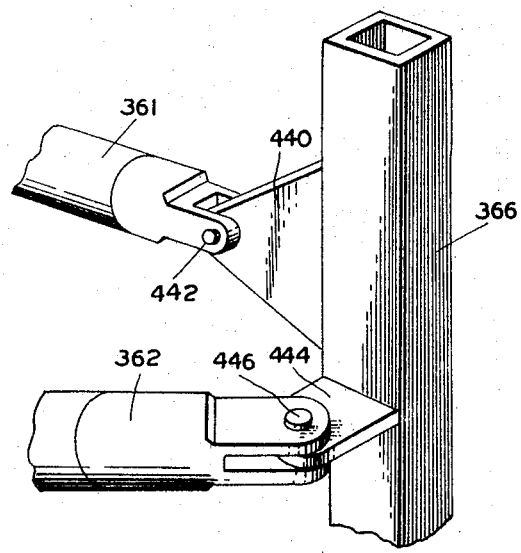
FIGURE 12 is a fragmentary enlarged view of a portion of the releasable lateral positioning means used in the second embodiment of the invention.

The inner boom section is also free to rotate about its own axis as mentioned above and this will be better understood by reference to the very generalized showing in FIGURES 8 and 9, and the very specific embodiments shown in FIGURES 10, 11 and 12. FIGURES 10 and 11 it will be seen that a pair of arms 328 and 370 are welded to the exterior of tubular section 324 and the outer ends of these arms support a pin 380 and swivel member 372.

Swivel member 372 is in turn connected by pin 400 to the end 374 of a hydraulic cylinder arm 376 that moves within hydraulic cylinder 362. The other end of hydraulic cylinder 362 (see FIGURE 12) is connected by means of a pin 446 to a mounting 444 on fixed upright cradle post 366. The primary function of cylinder 362 is to limit the axial movement of tubular section 324, as will be described more fully hereinafter.

The outer end of the outer boom section 342 is connected to a cutting assembly. This construction includes shaft 323 and a supporting framework comprising members 349, 350, 351 and 352. The cutting assembly is preferably of the type including a rotary cutting blade and a light-weight shroud 348 covering the top and sides of the blade.

The outer end of the inner boom 320 and the inner end of the outer boom 342 are joined to a pivot member that has an axis transverse to axes of said inner and outer boom sections, whereby said inner and outer boom sections can move relative to each other through a plane passing through both the axes of said inner and outer boom sections. As shown in FIGURES 8 and 9, boom portions 320 and 342 are pivotally connected by pin 336. Also connected to pin 336 is a pivotal section 335 which pivots about pin 336.

An adjustable linkage means is mounted on said laterally extending boom in order to adjust the angular relationship of said inner and outer boom sections with respect to each other. The adjustable linkage means as shown in FIGURES 8 and 9 consists of a first hydraulic cylinder 337 attached to a portion of boom 342 and to pivot section 335 which pivots about pin 336 and a second hydraulic cylinder 334 attached to boom portion 320 by means of its framework and connection is maintained with pivotal section 335. Movement of cylinders 337 and 334 results in a change in the positional relationship of the inner and outer booms. The cylinders are preferably actuated by the same pressure source and this pressure source is preferably separate from that of the other hydraulic cylinders in the device. If different forces occur on the portions of the boom the cylinders will compensate for the difference.

The cable arrangement in FIGURES 8 and 9 is slightly different from that shown with reference to FIGURE 3. The inner end of cable 418 is attached to an anchor hook 430 located on the crossmember 420 of the upstanding rigid framework 422 of the mobile base. The cable passes downwardly and around the roller (or pulley) 426 located on the end of arm 428 of hydraulic cylinder 424. The cable then goes upwardly and around another roller 414 that is mounted on the rigid framework 422 by means of bracket 416. (Actually, the cable preferably is guided around a multiple pulley arrangement in order to gain the greatest mechanical advantage and the simple system shown is only for purpose of illustration.) From there the cable goes outwardly through guide means 325, around the idler roller 601 in guide member 602 and then outwardly to the anchor point 604 which is shown as being located in guide means 325. (The term "rollers" has been used synonymously with rotating cable bearing member.)

Hydraulic cylinder 424 is the cable pulling means or the main boom lift cylinder. When the arm 428 of cylinder 424 moves down the cable will be pulled inwardly (and the boom upwardly) and when the arm 428 goes up the cable will be let out (and the boom will be lowered).

Figure 14:
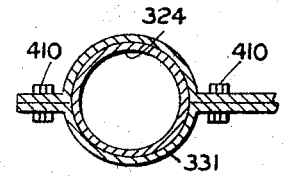
FIGURE 14 is a view along 14—14 of FIGURE 13.

The second embodiment of this invention also contains releasable lateral positioning means and it is located between the boom and the mobile base. This consists of a "connector means" extending between said mobile base and a point intermediate the ends of the inner boom 320, said connector comprising hydraulic cylinders 361 and 362 as is illustrated in FIGURES 8, 9, 10, 12 and 13. The location of cylinder 362 has already been described. As is shown in FIGURE 12, one end of hydraulic cylinder 361 is attached by a pin or bolt 442 to a mounting plate 440 located on fixed upright cradle post 366. The other end of cylinder 361 has an arm portion 360 that is connected to a collar 331 that is mounted around tubular section 324 and which is maintained at a fixed point along the length of tubular section 324 by means of flanges 406 and 408. FIGURE 14 shows that the collar 331 may be made in two sections and bolted together by a plurality of bolts 410. Hydraulic cylinders 361 and 362 are "releasable" when the pressure within the cylinders exceeds a predetermined level. Upon "release" of the cylinders (i.e. when the pressure exceeds a predetermined level) the boom will be free to pivot backwardly around a generally vertical axis (e.g. in directions A or B), thus avoiding damage to the boom. The operation of these cylinders will be described in greater detail in connection with the hydraulic system illustrated in FIGURE 15. (Basically the hydraulic system for hydraulic cylinders 361 and 362 is preferably tied in with hydraulic cylinder 424 so that there is a "slaving" action between the two, as will be described more fully hereinafter.)

One or more hydraulic cylinders (or other fluid operating means) are preferably linked from the outer boom to the cutting assembly so that the position of the cutting assembly with respect to the outer extremity of outer boom 342 can be adjusted about shaft 323, which is on an axis transverse to the length of the boom. In FIGURES 8 and 9, the preferred linkage system is illustrated whereby a single hydraulic cylinder 340 is utilized. Cylinder 340 is attached to an anchor plate on outer boom 342 and moves a lever arrangement 345, 346 and 347.

A drive motor 353 is mounted on the cutting assembly and is preferably hydraulic although an electric or internal combustion engine might be used. Since the preferred adjusting means is hydraulic, the hydraulic conduits may conveniently be extended to the cutter assembly to power the cutting operation through a hydraulic motor.

A valuable safety feature which is provided to prevent damage to the cutting assembly and boom will automatically retract the boom upon the engagement of an immovable object or foilage which is too dense for the cutter to sever. A pressure operated servo-valve operator is set to a predetermined pressure limit in the cutter motor drive circuit. Upon the attainment of this limit pressure, the boom lift cylinder 424 will be automatically actuated to lift the boom upwardly, thereby disengaging the cutter from its area of cutting. When the boom is lifted upwardly from the obstacle the operator can then maneuver so that the cutter assembly will cut in another area. In attaining this feature it is preferable to utilize different fluid circuits for the drive motor and for the boom adjusting cylinders. A servo-valve operator can be attached to the valve which controls the cylinder 424, and the servo is connected to the pressure line of the motor circuit. When the pressure in the motor circuit exceeds a certain level the servo will be actuated and the control valve for cylinder 424 will be opened thereby actuating the cylinder 424 (to cause the boom to lift).

FIGURE 15 illustrates a hydraulic circuit which can be used in accordance with the second embodiment of this invention. In this figure it will be seen that 500 is a check restriction valve that does not restrict flow into the main lift cylinder 424 although it does restrict or slow down the flow of fluid in the direction of arrow A. Thus, if the source of high pressure fluid should suddenly fail for any reason, the high pressure fluid within cylinder 424 would flow out through valve 500 in a slower fashion. Also since there is great weight against the piston in cylinder 424 (due to the weight of the boom and cutter), when valve 504 is moved so as to slacken the cable (by letting fluid out of cylinder 424), valve 500 controls the rate at which the cable will slacken. If valve 500 were not present then when the high pressure was cut off in cylinder 424 the whole boom assembly would drop like a stone.

512 is a pump for generating high pressure fluid which exits through line 514 and line 516. A gauge 518 is provided in this line. Valve 520 controls the flow of high pressure fluid to either side C or side D of the cutter motor 510 (thus permitting the cutter blade to be driven clockwise or counterclockwise). Valve 520 has a return line 522. For instance, high pressure fluid could flow through line 524, valve 520, line 526, in side D of cutter motor 510, out side C of cutter motor 510, through line 528, through valve 520 and out valve 522. Alternatively, high pressure fluid could flow in through line 524, through valve 520, through line 528, in side C, out side D, through line 526 and out return line 522.

Now if the cutter blade hits an obstruction, the rotation of the blade will be inhibited, which in turn will cause the pressure of the fluid in line 524 to build up. When the pressure reaches a certain point (say 1700 p.s.i. as indicated by gauge 518) the relief valve 530 will open permitting the high pressure fluid to flow out lines 532 and 534, where the fluid can thereafter push against a spring loaded servo cylinder 536. The rod 538 of servo cylinder 536 is designed to be mechanically linked to valve 504 (by mechanical linkage 540 shown in dotted lines) in such a way that as pressure is applied against 536, valve 504 will be opened so as to allow more fluid to go into cylinder 424, thus causing arm 428 to move downwardly so as to tighten cable 418 which causes the boom to raise upwardly and away from whatever is inhibiting rotation of the cutter blades. When the blades can freely rotate again, the pressure in lines 524 and 532 will drop, thus permitting relief valve 530 to close. The fluid in line 534 can then bleed out through line 544 (which is of reduced diameter so as to permit slow flow) to the return tank. Servo piston 536 will then return to its normal position (because of the springs) and it will no longer have any effect upon valve 504.

The pump 512 for the cutter is separate from the pump for the other pistons since it is not desirable for the varying load requirements of the pistons to influence the pressure being applied to the cutter motor.

FIGURE 15 also illustrates the "slave" relationship between cylinders 424, 361 and 362. For example if the boom encounters an obstruction (such as a post or tree) a backward force will be exerted on the boom. Since arms 361A and 362A are attached to the boom as shown, there will be a force exerted in the direction of arrows B and C which in turn will cause the pistons 361B and 362B to increase the pressure on the fluid within cylinders 361 and 362. The increase in pressure of the fluid in cylinders 361 and 362 is transmitted through lines 362C and 361C to cylinder 424, which causes arm 428 to move downwardly and raise the boom. It is thus seen that cylinders 361, 362 and 424 are "slaved" to each other so that when the boom encounters an obstruction the boom will essentially automatically raise itself upwardly from the obstruction. A further very important advantage of this novel arrangement is that when the boom "breaks-back" (as an inverted V) in order to cut close to the tractor, the least amount of force is needed to hold the boom (because the boom in effect becomes a crank because of the way it breaks in the middle) and because it is in close to the mobile base there is the least pressure in the lift cylinder 424 and also the least pressure in cylinders 361 and 362—which is desirable. Now, as the boom is extended outwardly (i.e., straight out) there is the maximum pressure in the lift cylinder 424 and of course the same pressure is applied in cylinders 361 and 362. This is desirable because you need more force against pistons 361B and 362B because the boom arm is longer and an obstruction force against the end of the boom in its extended position will have a greater effect than the same obstruction force against the boom when the boom is bent and in close to the mobile base. Stated in another way, by slaving cylinders 361, 362 and 424 together, the "breakaway" force for the boom is automatically varied depending upon how close the cutter is positioned to the mobile base by the boom. This automatically (and progressively) variable breakway force permits the use of a lighter boom and avoids the breakage of the boom that would occur if a fixed breakaway force existed regardless of the position of the boom or cutter.

In comparing the first and second embodiments of this invention it will be noted that the first embodiment employs only one breakaway cylinder 32, whereas the second embodiment has a breakaway cylinder 361 that is comparable to cylinder 32 of the first embodiment, but the second embodiment additionally has a second breakaway cylinder 362 which has no counterpart in the first embodiment because cylinder 362 restricts movement of the boom about its own axis. Stated another way, cylinder 362 restricts the "crank action" of the boom in the second embodiment. In a sense both cylinders 361 and 362 act as pumps for cylinder 424 (to lift cylinder 424 up) and thus can be designated as "slaving" cylinders 361 and 362 with cylinder 424. Cylinders 361 and 362 operate at angles to each other and in different planes.

For railroad use it may be desirable to pivot the entire boom assembly and cutter assembly from the side of the mobile base around to the front of the mobile base so as to minimize the overall width of the entire unit. This is easily accomplished by merely pulling boom section 320 to a generally vertical position, allowing boom section 342 to drop down essentially parallel to boom section 320, removing pin 380 so as to disengage cylinder 362 from arm 328, and then manually pivoting boom section 320 about its own axis, so that the cutter assembly will move around to the front of the mobile base. Special wheels for running on railroad tracks can also be put on the mobile base.

It is also desirable to counterbalance the weight of the boom by providing some type of counterbalancing weight on the side of the mobile base which is opposite to the boom. The weight can be fixed or automatically movable or manually movable by the driver in relation to the position of the boom.

FIGURE 16 shows a further variation of this invention, and particularly an alternative form of releasable breakaway means. An inner boom section (consisting of members 600, 602, 604, and 606) is shown as being connected by means of a pivot joint to a rockable cradle member. The pivot type joint consists of a housing 640 that is resiliently mounted around a spring (not shown) that is disposed between end 638 of bolt 639 and the end plate 641 of the inner boom portion. The inner end of bolt 639 is pivotally fastened by means of pin 644 to the bracket 636. Bracket 636 is mounted on rockable cradle member 626 which is free to pivot about pins 628 and 634, said pins being located in the ends of frame members 630 and 632 of the mobile base. Member 604 of the inner boom section has a V-shaped framework connected thereto consisting of members 608 and 610. Near one end of member 610 is bracket 612 to which is attached one end of a hydraulic cylinder 614. The other end 616 of cylinder 614 is attached to a cable 618, and the other end of cable 618 is attached to one end of cradle member 626. Bracket 620 supports a roller 622 that guides cable 618 as the inner boom portion moves. Cylinder 614 is generally comparable to cylinder 32 of FIGURE 1 and cylinder 361 of FIGURE 8 and is preferably tied in with the hydraulic cylinder that lifts the boom, in a similar manner to that described with respect to cylinders 361 and 424.

FIGURE 17 illustrates another important feature which is useful with the present invention. An outer boom section 700 is shown as being connected to a cutter assembly 702 in generally the same fashion as described previously. Cylinders 710 and 712 govern the angular disposition of the cutter assembly with respect to the boom. The cutter blade is driven by a reversible hydraulic motor 704 and lines 706 and 708 are the high pressure fluid lines for the hydraulic motor 704. For purposes of clarity the cutter blade assembly is shown removed from the cutter housing.

The cutter blade assembly is seen to consist of cutter blade spindle 714 whose bottom end is fastened to two spaced apart blade retaining bars 716 and 718. A blade pivot member 720 spans bars 716 and 718 and holds therebetween blade member 724. It will be noted that the blade end 726 has two sides and its outer end sharpened in order to achieve improved cutting. Above blade retaining bar 716 there is mounted a channel member 722 having upstanding side members. A wire collector device is shown mounted within this channel. The wire collector device as shown is seen to be generally U-shaped and consists of a bottom section 728 and two upstanding end sections or "paddles" 730 and 732. The wire collector is shown as being fastened to the other parts of the cutter blade assembly by means of bolts 734, although it will be understood that other fastening means may be employed.

When the cutter assembly moves into an overgrown area, wire, cable or the like may be tangled in with the vines and brush. The wire will ordinarily wrap itself around the spindle in a tight coil that is thereafter difficult to remove and sometimes cannot be removed except with a cutting torch. The novel construction of FIGURE 17 avoids wire problems because when the cutter assembly does encounter wire, the wire is caused to wrap around the two paddles 730 and 732 in the form of a relatively large diameter coil. The particular advantage of this is that the large coil of wire can be removed in a very easy manner, and quick fashion by the operator, simply by reversing the direction of the hydraulic motor and "spinning" the wire off by centrifugal force. The paddles are spaced at least one inch away from the spindle and preferably at least three inches.

What is claimed is:

1. A fluid operated cutting device on a mobile base comprising:
   (a) a laterally extending boom attached to said base by pivotal means connected to said base which will allow movement of said boom with respect to said mobile base about an axis which is parallel to the direction of travel of said mobile base and about a vertical axis, said boom consisting of an inner section and an outermost section;
   (b) a first fluid operating means attached between said boom and said base for adjusting said boom about said axis parallel to the direction of travel of said mobile base;
   (c) a releasable lateral positioning means attached between said boom and said mobile base to position said boom in a lateral direction with respect to said mobile base;
   (d) a pivotal means connected between the adjacent ends of the inner and outermost sections, said boom allowing relative movement of said inner section of the boom and the outermost section of said boom about an axis transverse to the length of said boom;
   (e) a second fluid operating means mounted on said laterally extending boom for adjusting the position of the outermost section of said boom about said pivotal means and with respect to the innermost section of said boom;
   (f) a cutting assembly pivotally mounted at the outer extremity of said boom to allow movement about an axis transverse to the length of said boom;
   (g) a third fluid operating means mounted between said cutting device and the outermost section of said boom for adjusting the position of said cutting assembly with respect to the outer extremity of said boom about said axis transverse to the length of said boom;
   (h) motor means mounted on said cutting assembly for driving the cutter of said cutting assembly; and
   (i) said first fluid means comprising a hydraulic cylinder attached to said mobile base, an arm pivotally attached to said mobile base about an axis parallel to the direction of travel of said base, said arm being movable by said hydraulic cylinder, a cable attached to said arm, said cable being attached to said outermost portion of said boom, and guide means on said boom for positioning said cable along the length of said boom.

2. A fluid operated cutting device on a mobile base comprising:
   (a) a laterally extending boom attached to said base by pivotal means connected to said base which will allow movement of said boom with respect to said mobile base about an axis which is parallel to the direction of travel of said mobile base and about a vertical axis, said boom consisting of an inner section and an outermost section;
   (b) a first fluid operating means attached between said boom and said base for adjusting said boom about said axis parallel to the direction of travel of said mobile base;
   (c) a releasable lateral positioning means attached between said boom and said mobile base to position said boom in a lateral direction with respect to said mobile base;
   (d) a pivotal means connected between the adjacent ends of the inner and outermost sections, said boom allowing relative movement of said inner section of the boom and the outermost section of said boom about an axis transverse to the length of said boom;
   (e) a second fluid operating means mounted on said laterally extending boom for adjusting the position of the outermost section of said boom about said pivotal means and with respect to the innermost section of said boom;
   (f) a cutting assembly pivotally mounted at the outer extremity of said boom to allow movement about an axis transverse to the length of said boom;
   (g) a third fluid operating means mounted between said cutting device and the outermost section of said boom for adjusting the position of said cutting assembly with respect to the outer extremity of said boom about said axis transverse to the length of said boom;
   (h) motor means mounted on said cutting assembly for driving the cutter of said cutting assembly;
   (i) said pivotal means for attaching said boom to said mobile base comprising a first plate attached to said mobile base, a shaft passing through said first plate, said shaft attached to said boom, a second plate on said boom bearing against said first plate, a cylinder around said shaft on the side of said plate opposite said boom, bearing means between said cylinder and said first plate, a compression spring within said cylinder, a stop plate on said shaft and adapted to retain said compression spring against a stop on said cylinder, said compression spring being biased so as to retain said cylinder against said first plate, and a ball detent carried by said cylinder whereby axial movement of said shaft with respect to said cylinder is restrained.

3. A fluid operated cutting device on a self-propelled mobile base comprising:
   (a) a laterally extending boom attached to said mobile base by pivotal means connected to said base which will allow movement of said boom with respect to said mobile base about an axis which is parallel to the direction of travel of said mobile base and about a vertical axis, said boom consisting of an inner section and an outermost section;
   (b) a pivotal means connected between the adjacent ends of the inner section and the outermost section of said boom which will allow relative movement of said inner section of the boom and the outermost section of said boom about an axis transverse to the length of said boom;

(c) said pivotal means including a pin through said axis transverse to said boom, an arm pivotally attached to said pin, a head plate mounted on said arm;

(d) a first hydraulic cylinder mounted on the innermost section of said boom and attached to said head plate;

(e) a second hydraulic cylinder mounted on the outermost section of said boom pivotal means and attached to said head plate;

(f) a pivotal arm attached to said mobile base which is pivotal about an axis parallel to the direction of travel of said mobile base;

(g) a third hydraulic cylinder mounted on said mobile base and attached to said pivotal arm on said mobile base;

(h) a flexible tension member passing from said pivotal arm on said mobile base and attached to said boom;

(i) guide means mounted on said innermost section of said boom on said outermost section of said boom and on said head plate on said arm attached to said pivotal means;

(j) said flexible tension member passing over said guide means and attached to said outermost section of said boom;

(k) releasable lateral positioning means attached between said boom and said mobile base to position said boom in a lateral direction with respect to said mobile base;

(l) a cutting assembly pivotally mounted at the outer extremity of said boom to allow movement about an axis transverse to the length of said boom, (m) a fourth hydraulic cylinder connected between said outermost boom section and said cutting assembly for adjusting the position of said cutting assembly with respect to the outer extremity of said boom about an axis transverse to the length of said boom; and (n) motor means for driving the cutter of said cutting assembly.

4. A fluid operated cutting device on a mobile base comprising:

(a) a laterally extending boom attached to said base by pivotal means connected to said mobile base which will allow movement of said boom with respect to said mobile base about a first axis which is parallel to the direction of travel of said mobile base and about a vertical axis, said boom consisting of an inner section and an outermost section;

(b) a first fluid operating means attached between said boom and said mobile base for adjusting said boom about said first axis;

(c) a releasable lateral positioning means attached between said boom and said mobile base to position said boom in a lateral direction with respect to said mobile base;

(d) a pivotal means connected between the adjacent ends of the inner section and the outermost section of said boom allowing relative movement of said inner section of the boom and the outermost section of said boom about an axis transverse to the length of said boom;

(e) a second fluid operating means mounted on said laterally extending boom for adjusting the position of the outermost section of said boom about said pivotal means and with respect to the innermost section of said boom;

(f) a cutting assembly mounted at the outer extremity of said boom; and (g) fluid operated motor means mounted on said cutting assembly for driving the cutter of said cutting assembly, the fluid circuit for said fluid motor including means to sense a predetermined pressure in said motor, servo means connected to the control means for the fluid operating means for adjusting the boom about an axis parallel to the direction of travel of said mobile unit, said servo means controlled by said sensing means whereby an obstruction of sufficient strength to cause the motor operating said cutter to attain the predetermined pressure limit the boom will be caused to lift said cutter upwardly from said obstruction.

5. A fluid operated cutting device on a mobile base comprising:

(a) a laterally extending boom attached to said base by pivotal means connected to said base which will allow movement of said boom with respect to said mobile base about an axis which is parallel to the direction of travel of said mobile base and about a vertical axis, said boom consisting of an inner section and an outermost section;

(b) a first fluid operating means attached between said boom and said base for adjusting said boom about said axis parallel to the direction of travel of said mobile base;

(c) a releasable lateral positioning means attached between said boom and said mobile base to position said boom in a lateral direction with respect to said mobile base;

(d) a pivotal means connected between the adjacent ends of the inner and outermost sections, said boom allowing relative movement of said inner section of the boom and the outermost section of said boom about an axis transverse to the length of said boom;

(e) a second fluid operating means mounted on said laterally extending boom for adjusting the position of the outermost section of said boom about said pivotal means and with respect to the innermost section of said boom;

(f) a cutting assembly pivotally mounted at the outer extremity of said boom to allow movement about an axis transverse to the length of said boom;

(g) a third fluid operating means mounted between said cutting device and the outermost section of said boom for adjusting the position of said cutting assembly with respect to the outer extremity of said boom about said axis transverse to the length of said boom; and (h) fluid operated motor means mounted on said cutting assembly for driving the cutter of said cutting assembly, the fluid circuit for said fluid motor including means to sense a predetermined pressure in said motor, servo means connected to the control means for the fluid operating means for adjusting the boom about an axis parallel to the direction of travel of said mobile unit, said servo means controlled by said sensing means whereby an obstruction of sufficient strength to cause the motor operating said cutter to attain the predetermined pressure limit the boom will be caused to lift said cutter upwardly from said obstruction.

6. A cutting device comprising in combination:

(a) a mobile base;

(b) a laterally extendible boom connected to said mobile base;

(c) the inner end of said boom being pivotally mounted on said mobile base so that it can move both horizontally and vertically with respect to said mobile base;

(d) a cutting assembly, the outer end of said boom being connected to said cutting assembly;

(e) a first hydraulic cylinder means having one end connected to said boom and the other end connected to said mobile base so as to raise and lower said boom;

(f) a connector extending between said mobile base and a point intermediate the ends of said boom, said connector comprising a second hydraulic cylinder means;

(g) a hydraulic flow system interconnecting said first and second hydraulic cylinder means and being arranged so that pressure changes occurring adjacent one hydraulic cylinder may be transmitted to the other hydraulic cylinder.

7. A device according to claim 6 wherein said second hydraulic cylinder is biased against rearward movement of said boom from the lateral position.

8. An apparatus according to claim 6 wherein said second hydraulic cylinder is provided with a relief valve whereby rearward force of a predetermined level will release said second hydraulic cylinder thereby allowing said boom to pivot about a vertical axis to thereby protect said boom when obstructions are engaged by said boom.

9. A fluid operated cutting device on a mobile base comprising:
 (a) a laterally extending boom attached to said mobile base by pivotal means connected to said base, said boom consisting of an inner section and an outer section;
 (b) a first hydraulic cylinder means having one end connected to said boom and the other end connected to said mobile base so as to raise and lower said boom;
 (c) a connector extending between said mobile base and a point intermediate the ends of said inner boom, said connector including a second hydraulic cylinder means that has its hydraulic system tied in with the hydraulic system of said first hydraulic cylinder means;
 (d) pivotal means connected between the adjacent ends of the inner section and the outer section of said boom so as to allow relative movement of said inner section of the boom and the outer section of said boom about an axis transverse to the length of the boom;
 (e) a third hydraulic cylinder means mounted on said laterally extending boom for adjusting the position of the outer section of said boom about said pivotal means and with respect to the inner section of said boom; and
 (f) a cutting device, said cutting device being mounted at the outer extremity of said boom.

10. A mobile cutting device comprising in combination:
 (a) a mobile base;
 (b) a laterally extendible boom connected to said mobile base;
 (c) said laterally extendible boom comprising an inner boom section and an outer boom section;
 (d) the inner end of said inner boom section being mounted on said mobile base so that it can move both horizontally and vertically with respect to said mobile base;
 (e) a cutting assembly, the outer end of said outer boom section being connected to said cutting assembly;
 (f) the outer end of said inner boom and the inner end of said outer boom being joined to a pivot member that has an axis transverse to axes of said inner and outer boom sections, whereby said inner and outer boom sections can move relative to each other through a plane passing through both the axes of said inner and outer boom sections;
 (g) an adjustable linkage means mounted on said laterally extending boom for adjusting the angular relationship of said inner and outer boom sections with respect to each other;
 (h) cable means extending between said mobile base and said laterally extending boom; and
 (i) cable pulling means mounted on said mobile base for alternately pulling said cable means toward the mobile base and allowing said cable means to fall away from said mobile base.

11. A cutting device according to claim 10 wherein said adjustable linkage means comprises:
 (a) a first fluid operating means connected between said inner boom section and said pivot member for adjusting the position of said inner boom about said pivot member and with respect to the outer boom section; and
 (b) a second fluid operating means connected between said outer boom section and said pivot member for adjusting the position of said outer boom about said pivot member and with respect to the inner boom section.

12. A cutting device according to claim 10 wherein said cable has two end sections and an intermediate section, the outer end section of said cable being secured to the outer boom section, the intermediate section of said cable passing through at least one guide means located on the laterally extendible boom, and the other end section of said cable being engaged by cable pulling means located on said mobile base, whereby the degree of pull of said cable pulling means will govern the positional relationship of said boom sections to each other, to the mobile unit, and to the ground.

13. A cutting device according to claim 10 wherein said inner boom section is additionally mounted so that it can be pivoted to at least a limited extent about its own axis.

References Cited by the Examiner

UNITED STATES PATENTS

| | | | |
|---|---|---|---|
| 2,674,500 | 4/1954 | Hukare. | |
| 2,690,639 | 10/1954 | Goodwin | 56—328 |
| 2,997,835 | 8/1961 | Stewart | 56—25 |
| 3,061,996 | 11/1962 | Ripps | 56—25 |
| 3,087,296 | 4/1963 | Cowles | 56—25.4 |
| 3,237,388 | 3/1966 | Rishovd et al. | 56—25 |

ABRAHAM G. STONE, *Primary Examiner.*

RUSSELL R. KINSEY, *Examiner.*